«12» United States Patent
Zanini

(10) Patent No.: US 12,234,762 B2
(45) Date of Patent: Feb. 25, 2025

(54) MOTOR UNIT, PARTICULARLY FOR OPERATING MACHINES

(71) Applicant: MULTIONE SRL, Vicenza (IT)

(72) Inventor: Stefano Zanini, Vicenza (IT)

(73) Assignee: MULTIONE SRL, Vincenza (IT)

( * ) Notice: Subject to any disclaimer, the term of this patent is extended or adjusted under 35 U.S.C. 154(b) by 0 days.

(21) Appl. No.: 18/358,128

(22) Filed: Jul. 25, 2023

(65) Prior Publication Data

US 2024/0044278 A1 Feb. 8, 2024

(30) Foreign Application Priority Data

Jul. 26, 2022 (IT) .................. 102022000015651

(51) Int. Cl.
*F01P 1/06* (2006.01)
*F01P 5/02* (2006.01)
*F01P 11/10* (2006.01)

(52) U.S. Cl.
CPC .... *F01P 1/06* (2013.01); *F01P 5/02* (2013.01); *F01P 11/10* (2013.01); *F01P 2060/02* (2013.01)

(58) Field of Classification Search
CPC ...... F01P 1/06; F01P 5/02; F01P 11/10; F01P 2060/02; F01P 3/20; F01P 3/18; B60K 11/02; B60K 11/04; F02B 29/0456; F02B 29/0475; F02B 29/0431
See application file for complete search history.

(56) References Cited

U.S. PATENT DOCUMENTS

| 4,342,200 A * | 8/1982 | Lowi, Jr. ................... F01P 9/06 60/599 |
| 8,616,316 B2 * | 12/2013 | Demma ................ B60K 11/04 165/41 |
| 2003/0121638 A1 | 7/2003 | Molari et al. |
| 2006/0086548 A1 | 4/2006 | Moramatsu et al. |
| 2010/0089088 A1 | 4/2010 | Kardos et al. |
| 2016/0160803 A1 * | 6/2016 | Gopireddy .......... F02B 29/0418 123/568.12 |
| 2017/0152766 A1 * | 6/2017 | Andersson ............. F01K 9/003 |
| 2018/0051193 A1 | 2/2018 | Mayer |
| 2018/0051933 A1 | 2/2018 | Meyer |

FOREIGN PATENT DOCUMENTS

IT     T0990342     10/2000

* cited by examiner

*Primary Examiner* — Hoang M Nguyen
(74) *Attorney, Agent, or Firm* — DUANE MORRIS LLP; Gregory M. Lefkowitz; Joaquin Hernandez

(57) ABSTRACT

A motor unit, particularly for operating machines, comprising an internal combustion engine provided with a cooling system that comprises a first heat exchanger fluidically connected to a cooling circuit obtained in said motor, and ventilation means adapted to generate an air flow through the first heat exchanger; the motor being further provided with a supercharging system that comprises a turbine mounted along an exhaust duct, a compressor mounted along a suction duct and a second heat exchanger placed along the suction duct, downstream of said compressor. The motor unit comprises fluid conveying means adapted to make a flow of cooling air pass through the second heat exchanger, such flow being generated by the ventilation means.

8 Claims, 5 Drawing Sheets

MOTOR UNIT, PARTICULARLY FOR OPERATING MACHINES

The present invention relates to a motor unit, adapted in particular to be installed on operating machines.

It is known that many self-propelled operating machines that are used in agriculture, industry, and construction are equipped with internal combustion engines.

Each engine is generally provided with various systems necessary for its operation, including a combustion air intake system.

This intake system usually comprises a suction duct adapted to connect an air intake with an engine intake manifold, which conveys combustion air into the cylinders.

An air cleaner assembly is also usually installed along the suction duct, which usually comprises at least one septum of porous material adapted to trap dust particles and/or other impurities which may be present in the air flowing from the air intake to the engine.

Then, in many cases, the engines are also equipped with a supercharging system, typically a turbocharger, which substantially has the function of increasing the air pressure entering the engine, improving cylinder filling.

However, the air exiting the turbocharger must be cooled before entering the engine, in order to increase the density of said air and thus the amount of combustion [air] contained in the cylinder at the end of the intake, thus improving the exploitation of the displacement and avoiding pre-combustion phenomena caused by an excessive temperature.

The combustion air cooling function is generally carried out by a device known as an intercooler; substantially, it is a heat exchanger of the air-to-air or air-to-water type, which cools the air leaving the turbocharger before it enters the engine.

In particular, air-to-air intercoolers are heat exchangers which substantially appear as a normal radiator, in which outside air is used to cool the air "heated" by the compressor before being fed into the combustion chamber of the engine.

The configuration of this type of exchanger is generally very simple but their proper positioning is critical for good efficiency.

Indeed, the exchanger of an air-to-air intercooler must be mounted in a position in which it can be struck with an adequate air flow; in cases in which this is not possible, it is of use to resort to various technical stratagems.

One of the solutions that are commonly adopted to promote heat transfer in air-to-air type heat exchangers is to provide additional ventilation means installed at the exchanger.

However, these systems used to increase cooling are relatively expensive and involve complications, which are not exactly negligible from both a construction and engine management point of view, so they lose at least some of the advantages associated with the simplicity which should characterize air-to-air coolers.

The aim of the present invention is to provide a motor unit, adapted in particular to be installed on operating machines, which overcomes the drawbacks of the known art mentioned above.

Within this aim, a particular object of the invention is to provide a motor unit in which the intercooler of the supercharger system makes it possible to optimize the heat transfer between the external cooling air and the combustion air flowing inside the heat exchanger.

Another object of the invention is to provide a motor unit in which the intercooler is safe and mechanically strong.

Another object of the invention is to provide a motor unit in which the intercooler is structurally simple yet functionally very efficient.

Not least an object of the invention is to provide a motor unit in which the intercooler is easy to install and can be produced at low cost.

This aim and objects, as well as others which will be more apparent below, are achieved by a motor unit, particularly for operating machines, comprising an internal combustion engine provided with a cooling system that comprises a first heat exchanger that is fluidically connected to a cooling circuit obtained in said motor, and ventilation means adapted to generate an air flow through said first heat exchanger; said motor being further provided with a supercharging system that comprises a turbine mounted along an exhaust duct, a compressor mounted along a suction duct and a second heat exchanger placed along said suction duct, downstream of said compressor; said motor unit being characterized in that it comprises fluid conveying means adapted to pass a flow of cooling air through said second heat exchanger, said flow being generated by said ventilation means.

Further features and advantages will be more apparent from the description of a preferred, but not exclusive, embodiment of a motor unit according to the invention, illustrated for the purposes of non-limiting example in the accompanying drawings, in which.

Figure 1:
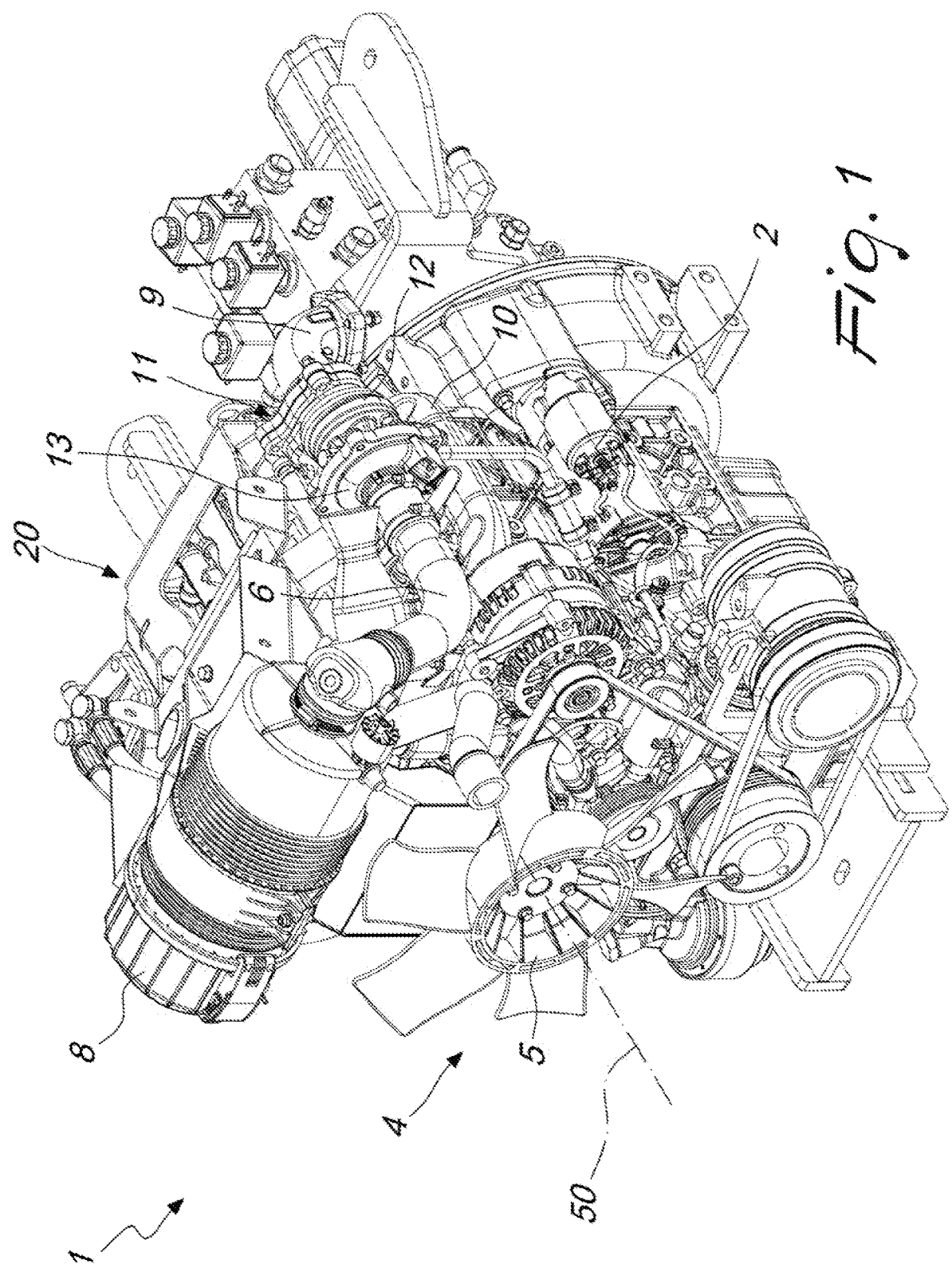
FIG. 1 is a perspective view of the motor unit according to the invention.
Figure 2:
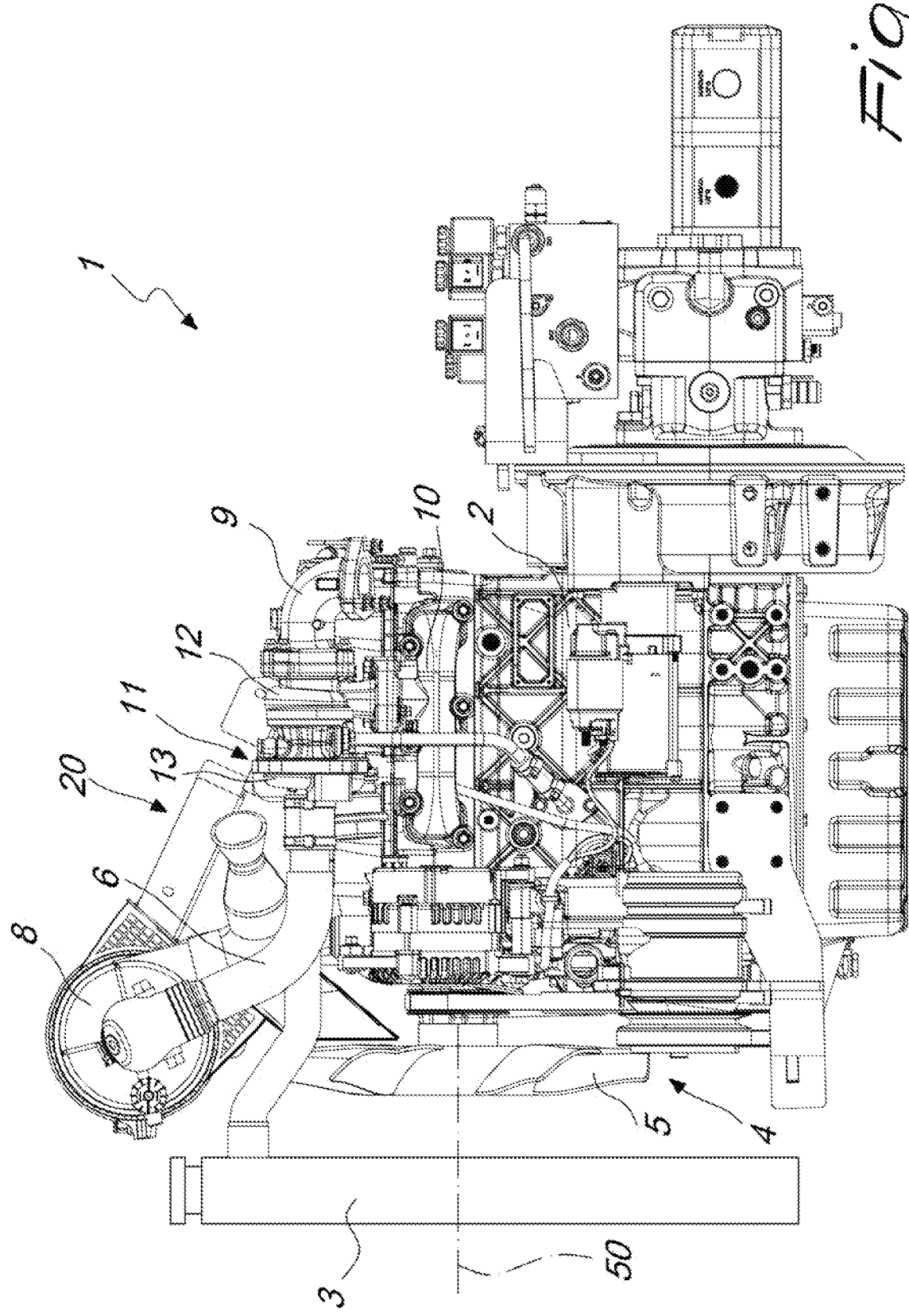
FIG. 2 is a side view of the motor unit according to the invention.
Figure 3:
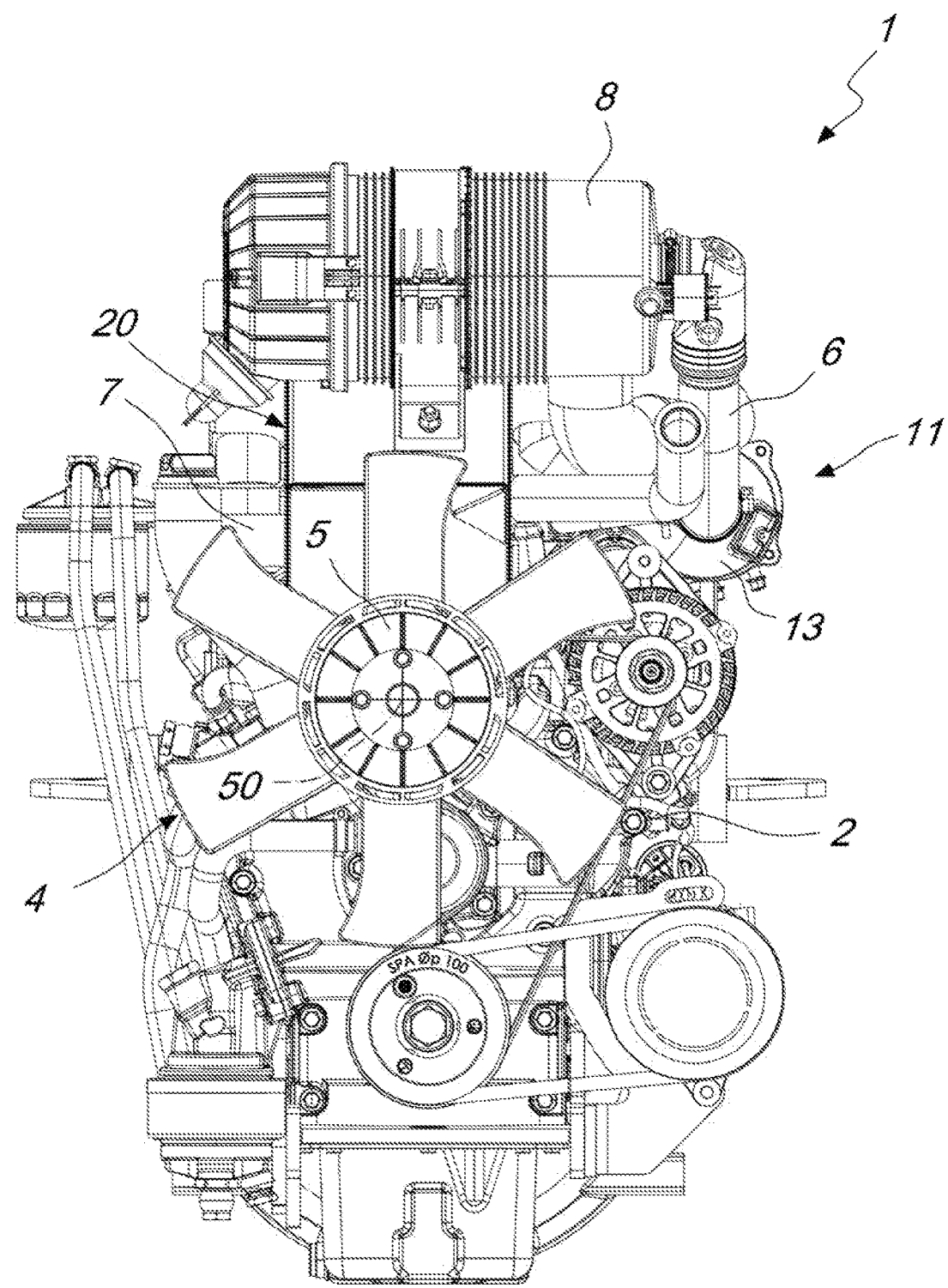
FIG. 3 is a front view of the motor unit according to the invention.
Figure 4:
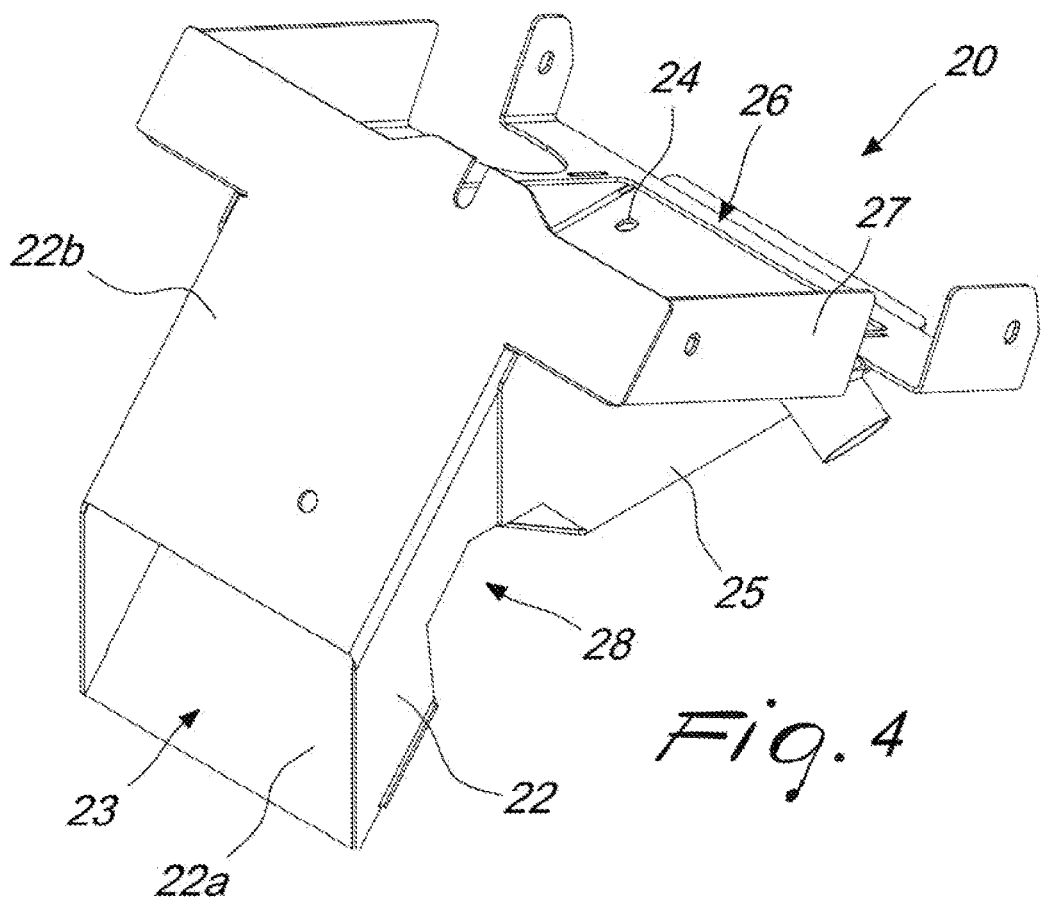
FIG. 4 is a perspective view of a component of the motor unit according to the invention.
Figure 5:
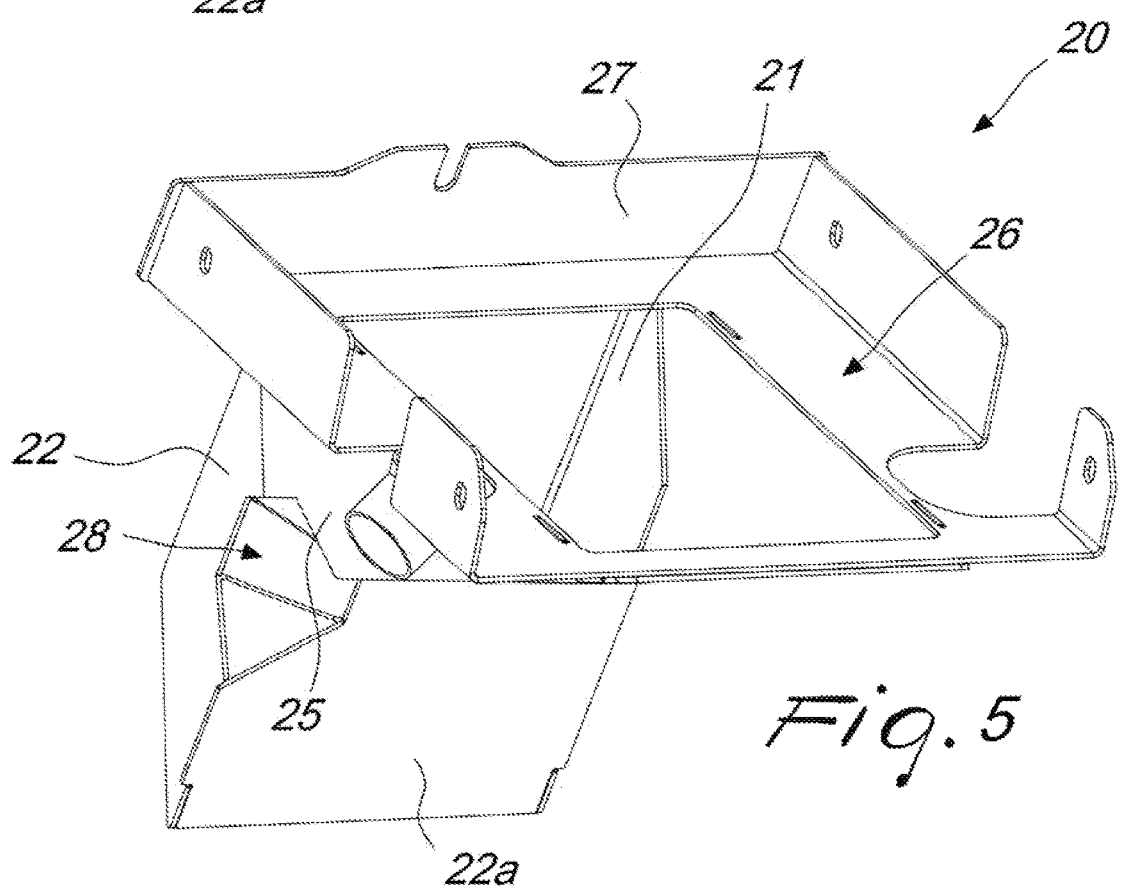
FIG. 5 is another perspective view of the component of FIG. 4.
Figure 6:
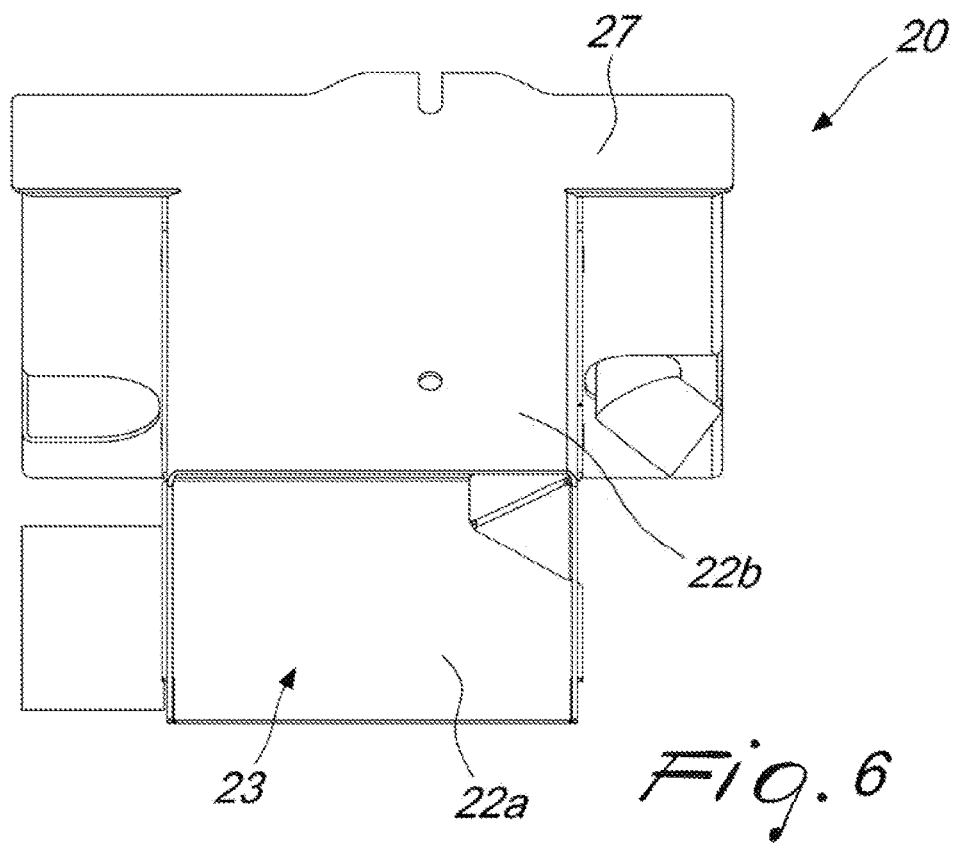
FIG. 6 is a front view of the component in FIGS. 4 and 5.
Figure 7:
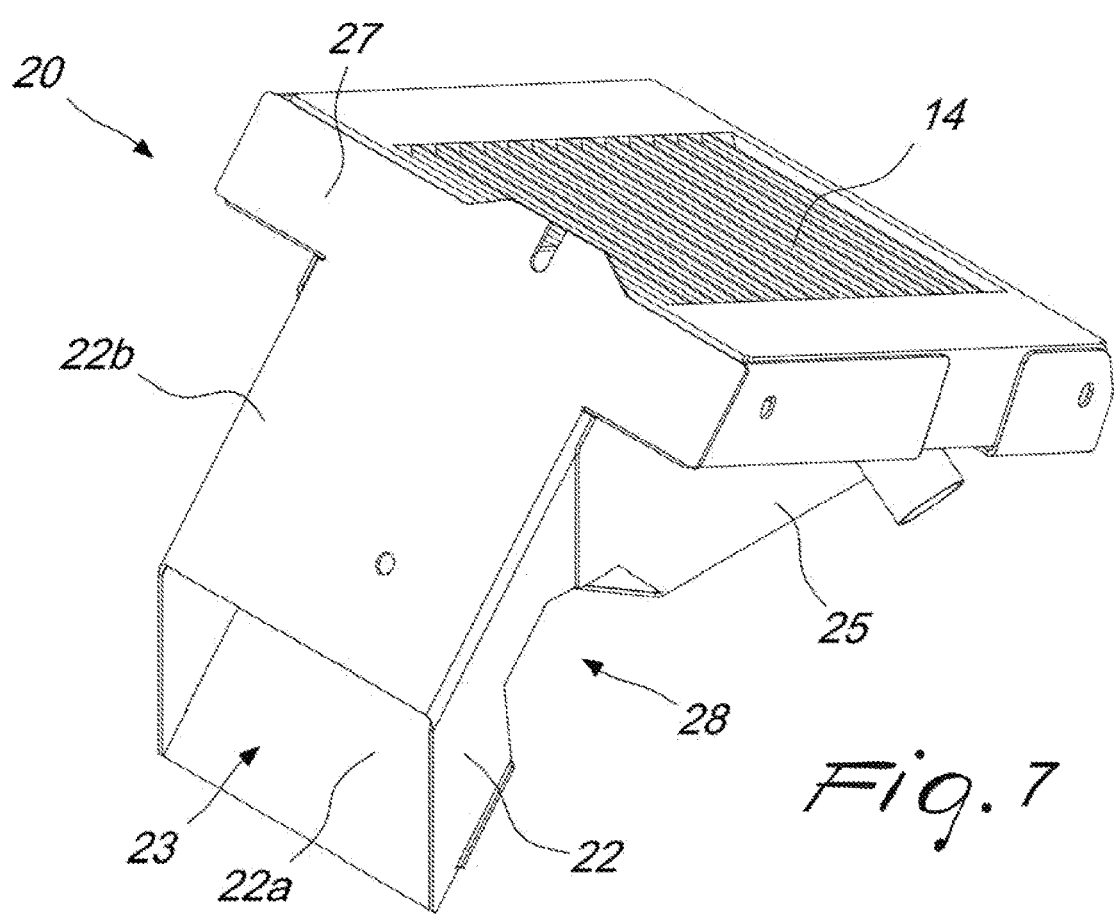
FIG. 7 is another perspective view of the component in figures from 4 and 6.

With reference to the aforementioned figures, a motor unit, particularly for operating machines, generally indicated by the reference numeral 1, comprises an internal combustion engine 2, per se known and not described in detail.

The motor 2 is provided with a cooling system that comprises a first heat exchanger 3, of the air/water type, in fluid connection with a cooling circuit obtained in the body of said motor 2.

The aforesaid cooling system further comprises ventilation means 4 adapted to generate an air flow through the first heat exchanger 3.

Preferably, the ventilation means 4 are defined by a fan 5 mounted so that it can rotate around a rotation axis 50.

In a manner per se known, the engine 2 has a suction duct 6 adapted to convey the combustion air coming from the external environment towards the combustion chambers, passing through an intake manifold 7.

A filter assembly 8 is placed along the suction duct 6.

Furthermore, the engine 2 has an exhaust duct 9 which originates from an exhaust manifold 10 and feeds the exhaust gases produced by combustion to an exhaust system, not shown.

The engine 2 is further provided with a supercharger system 11 of the turbocharger type, which is substantially constituted by a turbine 12 installed along the exhaust duct 9 and by a compressor 13 installed along the suction duct 6.

Appropriately, the supercharger system 11 further comprises a second heat exchanger 14, of the air/air type, arranged along the suction duct 6, downstream of the compressor 13.

According to the present invention, the motor unit 1 comprises fluid conveying means configured to pass a cooling air flow through the second heat exchanger 14.

Incidentally, it is worth noting that the cooling air flow is generated by the ventilation means 4 that normally already equip the engine cooling system 2, so by virtue of the fluid conveying means no additional ventilation means are required for cooling the second heat exchanger 14.

In this regard, the fluid conveying means essentially consist of a hollow element 20, open at both ends, made of heat-resistant and substantially rigid material, in particular sheet metal.

The hollow element 20 defines within it a cavity 21 through which the flow of cooling air generated by the ventilation means 4 can pass.

In greater detail, a first end portion 22 of the hollow element 20 defines an output opening 23 of the cooling air flow, which in use is arranged proximate to the fan 5.

Incidentally, it is worth noting that experimental tests carried out by the Applicant and a careful analysis of the results have shown that the distance between the output opening 23 and the fan 5 must be comprised preferably between about 5 mm and about 15 mm.

In this regard, the hollow element 20 advantageously comprises first fastening means 24, consisting, in this case, of a series of holes, only one of which is visible in the figures, which are configured to keep the distance between the output opening 23 and the fan 5 within the range shown above.

In this regard, the first end portion 22 has a substantially rectangular cross-section and has a bottom wall 22a and a top wall 22b, opposite and parallel to each other, which in use are tilted with respect to the rotation axis 50 of the fan 5.

A second end portion 25 of the hollow element 20 defines an input opening 26 of the cooling air flow, with which the second heat exchanger 14 is directly associated.

Advantageously, at the input opening 26 a perimeter edge 27 is arranged which substantially reproduces, in matching form, the profile of the second heat exchanger 14.

In this regard, the perimeter edge 27 is configured to keep, in use, the second heat exchanger 14 tilted with respect to the rotation axis 50 of the fan 5.

It will be apparent to the person skilled in the art that in a different embodiment, not shown for the sake of simplicity, the input opening 26 and the output opening 23 could have different construction characteristics from those described and illustrated; moreover, they could switch roles if the fan 5 rotates in the opposite direction from that shown in the example.

Appropriately, the hollow element 20 laterally has a recess 28 adapted to accommodate part of the engine cooling system 2.

In a variation of embodiment, not shown, the hollow element 20 also has thermal insulation means, associated with the face of the hollow element 20 facing the engine 2, so as to thermally shield the cavity 21 from the heat produced by said engine 2.

The operation of the motor unit according to the invention is apparent from what is described and illustrated and, in particular, is substantially as follows.

When the engine 2 is running, the ventilation means 4 aspirate cooling air from the surrounding environment and generate a flow through the first heat exchanger 3, ensuring the cooling of said engine.

At the same time, the ventilation means 4 create a vacuum in the fluid conveying means, i.e., inside the hollow element 20, by causing a flow of cooling air to flow through the second heat exchanger 14, which is drawn from the environment surrounding the heat exchanger.

In this manner, the second heat exchanger 14 effectively cools the combustion air aspirated from the supercharger system 11 through the filter assembly 8 and the suction duct 6 before it reaches the intake manifold 7, and thus the engine 2.

The fluid conveying means, i.e., the hollow element 20, determine a rapid and effective lowering of the temperature of the combustion air intended to feed the combustion chambers of the engine 2.

Incidentally, it is worth noting that all this is achieved without the need for any additional fans installed at the second heat exchanger 14.

In practice, it has been found that the invention achieves the set aim and objects by having providing a motor unit, particularly for operating machines, which makes it possible to optimize the heat transfer between the external cooling air and the combustion air flowing inside the air/air heat exchanger of the supercharger system.

A particular advantage of the present invention is that the fluid conveying means installed on the engine supercharger system are safe, mechanically strong, and functionally very efficient, while being structurally simple at the same time.

Furthermore, the aforesaid conveying means are easy to install and can be produced at relatively low cost.

The motor unit, particularly for operating machines, according to the invention is susceptible of numerous changes and variants, all within the scope of the inventive concept; furthermore, all details may be replaced by technically equivalent elements.

Obviously, the materials used, as well as the dimensions and the shapes, may be any according to the requirements and to the prior art.

This application claims the priority of Italian Patent Application No. 102022000015651, filed on Jul. 26, 2022, the subject matter of which is incorporated herein by reference.

The invention claimed is:

1. A motor unit for operating machines, comprising an internal combustion engine having a cooling system, that comprises a first heat exchanger that is fluidically connected to a cooling circuit obtained in said motor, and ventilation means adapted to generate an air flow through said first heat exchanger; said motor being further provided with a supercharging system that comprises a turbine mounted along an exhaust duct, a compressor mounted along a suction duct and a second heat exchanger mounted along said suction duct, downstream of said compressor; said motor unit being characterized in that it comprises fluid conveying means adapted to pass a flow of cooling air through said second heat exchanger, said flow being generated by said ventilation means; said fluid conveying means comprising a hollow element having two open ends and forming an inner cavity through which said cooling air can pass; a first end portion of said hollow element forming an output opening for the flow of cooling air, said output opening being arranged, during use, proximate to said ventilation means; a second end portion of said hollow element forming an input opening for the flow of cooling air, said input opening being associated with said second heat exchanger; said hollow element comprising first fastening means configured to maintain, during use, said output opening at a distance comprised between about 5 mm and about 15 mm, from a fan of said ventilation means, creating a vacuum in said fluid conveying means.

2. The motor unit, according to claim 1, wherein said first end portion of said hollow element has a substantially rectangular cross-section.

3. The motor unit, according to claim 1, wherein said first end portion of said hollow element comprises a bottom wall and a top wall that are substantially parallel to each other; during use, said bottom wall and said top wall being inclined with respect to an axis of rotation of said fan.

4. The motor unit, according to claim 1, wherein said second end portion of said hollow element has a perimetric edge at said input opening; said perimetric edge having a shape matching the profile of said second heat exchanger.

5. The motor unit, according to claim 1, wherein said perimetric edge is configured to maintain said second heat exchanger inclined with respect to said axis of rotation of said fan, during use.

6. The motor unit, according to claim 1, wherein it comprises thermal insulation means associated at least with the side of said hollow element that faces said motor.

7. The motor unit, according to claim 1, wherein said hollow element comprises at least one recess that is adapted to accommodate a portion of said cooling system.

8. The motor unit, according to claim 1, wherein said hollow element is made of a heat-resistant and substantially rigid material.

* * * * *